United States Patent
Weigand

(10) Patent No.: US 8,454,051 B2
(45) Date of Patent: Jun. 4, 2013

(54) AIRBAG MODULE FOR A VEHICLE OCCUPANT RESTRAINT SYSTEM AND METHOD FOR PRODUCTION THEREOF

(75) Inventor: Steffen Weigand, Aschaffenburg (DE)

(73) Assignee: Takata AG, Aschaffenburg (DE)

( * ) Notice: Subject to any disclaimer, the term of this patent is extended or adjusted under 35 U.S.C. 154(b) by 0 days.

(21) Appl. No.: 13/274,121

(22) Filed: Oct. 14, 2011

(65) Prior Publication Data

US 2012/0098239 A1    Apr. 26, 2012

(30) Foreign Application Priority Data

Apr. 20, 2009  (DE) .......................... 10 2009 018 168

(51) Int. Cl.
*B60R 21/217*  (2011.01)
(52) U.S. Cl.
CPC .................................. *B60R 21/217* (2013.01)
USPC ..................... 280/728.2; 280/741; 280/743.1; 280/742
(58) Field of Classification Search
CPC .................................................... B60R 21/217
USPC ............................ 280/728.2, 741, 743.1, 742
See application file for complete search history.

(56) References Cited

U.S. PATENT DOCUMENTS

| | | | |
|---|---|---|---|
| 4,332,398 A * | 6/1982 | Smith ............................. | 280/732 |
| 5,558,362 A | 9/1996 | Acker et al. | |
| 5,566,972 A | 10/1996 | Yoshida et al. | |
| 5,791,682 A | 8/1998 | Hiramitsu et al. | |
| 5,988,677 A * | 11/1999 | Adomeit et al. ............... | 280/740 |
| 6,050,600 A * | 4/2000 | Yoshida ......................... | 280/740 |
| 6,193,269 B1 | 2/2001 | Amamori | |
| 7,083,186 B2 * | 8/2006 | Lutz et al. .................... | 280/728.3 |
| 7,093,848 B2 * | 8/2006 | Karlsson et al. ........... | 280/728.3 |
| 2005/0225058 A1 | 10/2005 | Braun | |
| 2007/0278769 A1 | 12/2007 | Glaab | |
| 2008/0073883 A1 | 3/2008 | Fischer et al. | |

FOREIGN PATENT DOCUMENTS

| | | |
|---|---|---|
| DE | 44 41 187 A1 | 6/1995 |
| DE | 197 37 067 C1 | 12/1998 |
| DE | 699 20 104 T2 | 11/1999 |
| DE | 102 16 217 A1 | 10/2003 |
| DE | 10 2006 045 245 A1 | 4/2008 |
| EP | 0 680 851 A1 | 11/1995 |
| EP | 1 737 708-1 | 1/2007 |
| EP | 1 923 276 A1 | 5/2008 |
| WO | WO-03/084784 A1 | 10/2003 |

* cited by examiner

*Primary Examiner* — Joseph Rocca
*Assistant Examiner* — Karen Beck
(74) *Attorney, Agent, or Firm* — Foley & Lardner LLP

(57) ABSTRACT

An airbag module including an airbag, a gas generator introduced into an opening in the airbag, and a gas generator support on which the gas generator is fixed. The gas generator is arranged with respect to the gas generator support such that in case of activation the airbag pulls the gas generator onto the gas generator support. The gas generator support has an opening through which the non-inflated airbag is pulled such that a first region of the airbag, which does not surround the gas generator, is located on the one side of the opening and a second region of the airbag, which surrounds the gas generator, is located on the other side of the opening, and the opening is dimensioned such that the gas generator cannot be pulled through the opening.

11 Claims, 6 Drawing Sheets

AIRBAG MODULE FOR A VEHICLE OCCUPANT RESTRAINT SYSTEM AND METHOD FOR PRODUCTION THEREOF

CROSS-REFERENCE TO A RELATED APPLICATION

This application is a continuation of International Patent Application Number PCT/EP2010/055101, filed on Apr. 19, 2010, which was published in German as WO 2010/121985. The foregoing international application is incorporated by reference herein.

BACKGROUND

This invention relates to an airbag module for a vehicle occupant restraint system and to a method for producing such airbag module.

From the document EP 1 737 708 B1 an airbag module for a vehicle occupant restraint system is known, which includes an airbag, a tubular gas generator arranged in the airbag, and a gas generator support. The gas generator support serves for fixing and holding the tubular gas generator. For fixing the tubular gas generator bolts are provided at the tubular gas generator, which extend radially away from the same and protrude from the airbag, so that the gas generator together with the airbag can be screwed to the gas generator support.

From the document EP 0 680 851 A1 an airbag module of a vehicle occupant restraint system is known, which provides a fixation of a gas generator at a gas generator housing by an elastic clamp receptacle.

From the documents U.S. Pat. No. 5,791,682 A and DE 44 41 187 A1 airbag modules are known, in which an airbag pulls a gas generator onto a gas generator support in case of activation.

SUMMARY

It is the object underlying the present invention to provide an airbag module for a vehicle occupant restraint system which can be produced in a simple way. Furthermore, a method for the production of such airbag module should be provided.

According to an exemplary embodiment of the invention it is provided that the gas generator is arranged with respect to the gas generator support such that in case of activation the airbag pulls the gas generator onto the gas generator support. Hence, the fixation is such that in case of activation the airbag, which is filled with gas, exerts tension on the gas generator and thereby presses the same against the gas generator support. Due to this mode of operation it is not necessary to screw the gas generator to the gas generator support. Rather, it is sufficient to fix the gas generator at the gas generator support for example by means of latching. The necessity to provide bolts at the gas generator and screw the same into the gas generator support thus is eliminated.

In accordance with an exemplary embodiment of the invention, it is further provided that the gas generator support has an opening through which the non-inflated airbag is partly pulled. As a result, a first region of the airbag is defined, which does not surround the gas generator and which is located on the one side of this opening. A second region of the airbag, which surrounds the gas generator, is located on the other side of the opening. The first region of the airbag, which does not surround the gas generator, can be folded to an airbag package. The opening is dimensioned such that the gas generator cannot be pulled through the opening, so that in case of activation, when the second region of the airbag is filled with gas, the airbag pulls the gas generator onto the gas generator support.

The solution according to the invention is simple, as it saves components with the bolts previously required. In addition, it allows an easy production and assembly of an airbag module, since the requirement of screwing a gas generator to the gas generator support is eliminated. The assembly hence can be effected in few working steps without the necessity of screw connections.

In one exemplary aspect of the invention it is provided that the airbag and the gas generator opening are formed and arranged such that in case of activation, when the airbag pulls the gas generator against the gas generator support, the gas generator opening of the airbag is at least partly closed and hence the airbag is at least approximately sealed in a gas-tight manner. For this purpose it can be provided, for example, that an airbag portion adjoining the gas generator opening at least partly extends between the gas generator and the gas generator support, so that in case of activation, when the gas generator presses against the gas generator support, it is clamped between the same in a gas-tight manner. Thus, it is achieved that the gas generator opening for introducing the gas generator into the airbag is closed in the decisive moment, i.e. upon activation of the airbag, in an at least approximately gas-tight manner without further means, so that through this opening no gas or only a reduced amount of gas can escape from the airbag.

In one exemplary embodiment, it can be provided that one end of the gas generator protrudes from the airbag, so that this end can be connected with an electrical connecting cable in a simple way.

The opening in the gas generator support for example is formed as slot. However, any other shapes for forming the opening can also be provided. It is also conceivable that the opening is formed by an edge-side recess or indentation of the gas generator support.

It should be noted that a gas generator support in the sense of the present invention is every structure which serves to hold a gas generator. Numerous designs are possible. For example, it is a component which serves to fix the airbag module at a vehicle structure such as the seat frame of a vehicle seat or a supporting element of the vehicle body. It can be provided that the gas generator support forms part of the housing of the airbag module or together with further elements, such as a covering cap, forms the module housing.

As mentioned already, in one aspect of the invention the gas generator is locked into place at the gas generator support. If the gas generator is a tubular gas generator, which is the case in one aspect, locking into place is effected for example by means of latching arms of the gas generator support, which at least partly surround the tubular gas generator on its circumference. A fixation of the gas generator at the gas generator support can, however, also be effected in some other way, for example by means of an adhesive tape. It is not necessary to provide a fixation which would have to withstand large forces, since due to the functionality according to the invention the airbag pulls the gas generator onto the gas generator support in case of activation and hence the existing fixation between the gas generator and the gas generator support is secured in case of activation. In particular, a screw connection between the gas generator and the gas generator support can therefore be omitted.

In a further exemplary aspect of the invention, the gas generator support has a first side (e.g. upper side) and a second side (e.g. bottom side). In one aspect, it is formed substantially flat apart from a receiving region for holding the gas generator and an opening for leading through the airbag. The region of the airbag which does not surround the gas generator is arranged on the one side of the gas generator support, whereas on the other side of the gas generator support the gas generator is locked into place at the same. It can be provided that the gas generator is exclusively and completely arranged on the other side of the gas generator support and is locked into place at the same or fixed at the same in some other way.

In another exemplary aspect of the invention it is provided that the airbag module furthermore includes a cover which surrounds the folded airbag. In one aspect, the cover is latchable with the gas generator support. This provides for an easy connection between the cover and the gas generator support. The cover and the gas generator support form the module housing of the airbag module.

An exemplary embodiment of the invention also relates to a method for producing an airbag module, which comprises the following steps:

providing an airbag which includes a gas generator opening for introducing a gas generator into the airbag, as well as a gas generator and a gas generator support, introducing the gas generator into the gas generator opening, and arranging the gas generator with respect to the gas generator support such that in case of activation the airbag presses the gas generator onto the gas generator support, wherein the non-inflated airbag is pulled through an opening of the gas generator support such that a first region of the airbag, which does not surround the gas generator, is located on the one side of the opening and a second region of the airbag, which surrounds the gas generator, is located on the other side of the opening.

The gas generator is arranged such that gas emerging from the gas generator at least chiefly fills the first region of the airbag, so that the same is inflated and the gas generator thereby is pulled onto the gas generator support.

In one exemplary embodiment it is furthermore provided that in case of activation the airbag pulls the gas generator against the gas generator support such that the gas generator opening is closed in a gas-tight manner. For this purpose it is provided, for example, that a portion of the airbag adjoining the gas generator opening is at least partly positioned between the gas generator and the gas generator support, so that in case of activation, when the gas generator presses against the gas generator support, this portion is clamped between the gas generator and the gas generator support in a gas-tight manner, whereby the gas generator opening is at least partly closed.

BRIEF DESCRIPTION OF THE DRAWINGS

The invention will be explained in detail below by means of several exemplary embodiments with reference to the Figures of the drawing.

DETAILED DESCRIPTION

Figure 1:
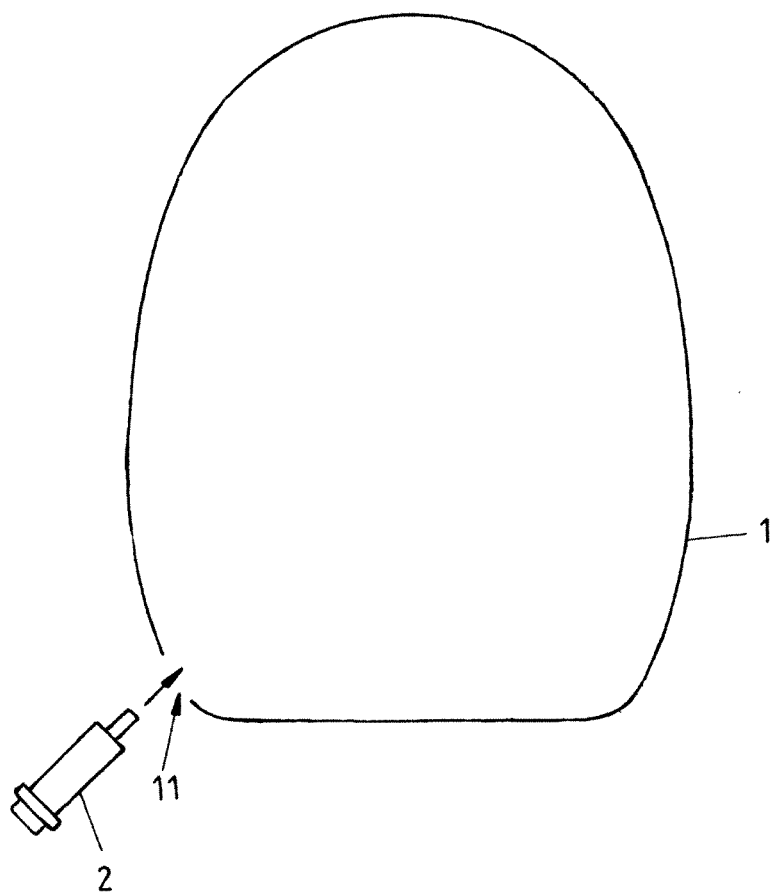
FIG. 1 schematically shows an airbag with a gas generator opening and a gas generator.

FIG. 1 schematically shows an airbag 1 which can be any airbag of a vehicle occupant restraint system. For example, it is an airbag which has two airbag layers that are sewn together at their edge region. The airbag 1, however, can also have any other number of layers and/or be formed in some other way.

Furthermore, a gas generator 2 is shown, which in the illustrated schematic example is a tubular gas generator. The gas generator can, however, also be formed in a way other than as tubular gas generator.

In the airbag 1 a gas generator opening 11 is provided, which serves for introducing the gas generator 2 into the airbag 1. The gas generator opening 11 for example is formed circular or polygonal, in dependence on the method of production and/or the shape of the gas generator 2 which is introduced into the gas generator opening 11. It is formed for example by an interruption of a peripheral seam of the airbag 1, with other designs being possible as well.

Figure 2:
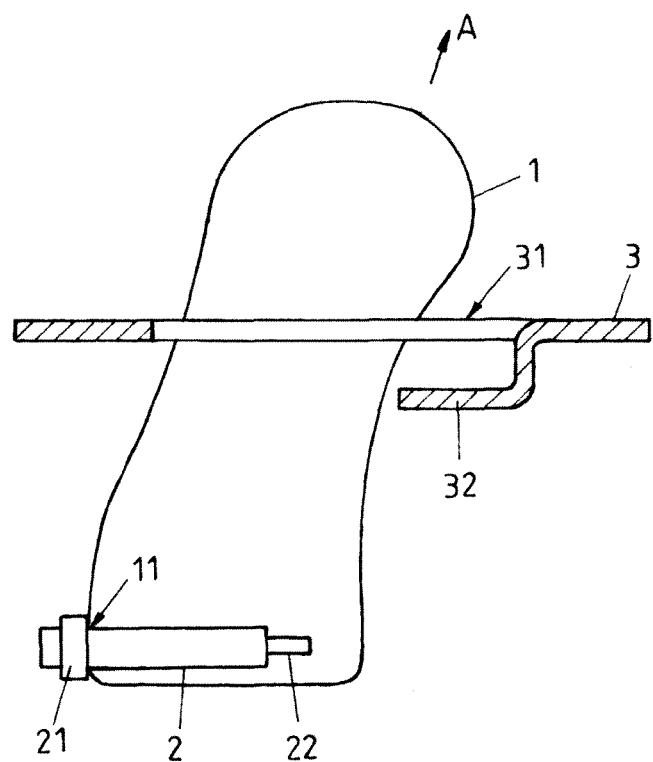
FIG. 2 schematically shows the airbag and the gas generator of FIG. 1 together with a gas generator support, wherein the gas generator is introduced into the airbag and the airbag is at least partly pulled through an opening of the gas generator support.

FIG. 2 shows the gas generator 2 introduced into the gas generator opening 11 of the airbag 1 and a sectional representation of a gas generator support 3 which has an opening 31. The opening 31 for example is formed as slot. Other shapes can, however, also be provided, and it is merely important that the opening 31 is dimensioned such that the gas generator 2 cannot be pulled through the opening 31. In principle, it is also conceivable that the opening is formed in an edge region of the generator support 3, for example in the form of an indentation.

FIG. 2 shows that the gas generator 2 is not completely introduced into the airbag 1, but rather the one end 21 of the gas generator protrudes form the airbag. The other end 22 of the gas generator 2, from which gas escapes upon ignition of the gas generator in a manner known per se, however is located inside the gas generator 1.

By arranging the gas generator 2 in the airbag 1 such that the gas generator 2 is only partly arranged inside the airbag 1 and one end 21 of the gas generator protrudes from the airbag, an electrical connection of the gas generator 2 can be realized in a simple way. For example, the protruding end 21 is formed with an electrical connection in the form of an appliance plug and a connecting cable (not shown).

However, it also lies within the scope of the invention that the gas generator 2 is completely introduced into the airbag 1.

The gas generator 2 arranged in the airbag 1 now is fixed at the gas generator support 3 such that the non-inflated airbag 1 first is guided through the opening 31 of the gas generator 3, corresponding to the direction of the arrow A of FIG. 2. The airbag 1 is pulled through the opening 31, until the gas generator 2 comes to rest against the bottom side of the generator support 3.

Figure 3:
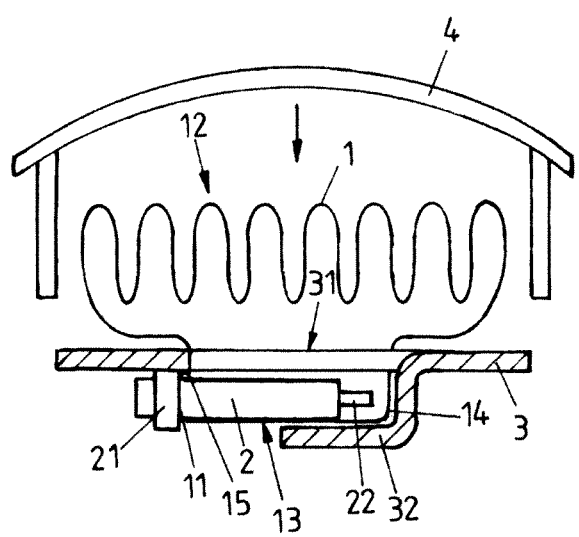
FIG. 3 shows the completely assembled arrangement of FIG. 2 together with a generator cover.

FIG. 3 shows the completely assembled module. The gas generator 1 is arranged on the bottom side of the gas generator support 3, wherein an angled region 32 of the gas generator support 3 serves for receiving and bearing the one end of the gas generator 2. In addition, non-illustrated clamping elements are provided, which resiliently enclose the end 21 of the gas generator 2 protruding from the airbag.

In the completely assembled condition of FIG. 3, the airbag 1 substantially is pulled through the opening 31 of the gas generator support 3. Correspondingly, the airbag 1 forms a first region 12 on the one side of the opening 31. In this region 12, the airbag 1 is folded to an airbag package, as is schematically shown in FIG. 3. The kind of folding can be chosen as desired.

A second region 13, which surrounds the gas generator opening 11, is located on the other side of the opening 31. This region 13 comprises at least one airbag portion 14 which is guided around the region of the gas generator 2 that is located inside the airbag 1.

Furthermore, it should be noted that the region 13 comprises an airbag portion 15 which adjoins the gas generator opening 11 and is located between the wall of the gas generator 2 and the gas generator support 3.

The module furthermore includes a schematically illustrated covering cap 4 which is put onto the folded airbag package 1 and for example is connected with the generator support 3 via latching connections. The covering cap 4 has a non-illustrated tear line.

In the case of activation of the gas generator 2 gas flows out from the one end 22 of the gas generator 2 into the airbag 1. This end 22 of the gas generator 2 includes outflow openings (not shown) from which the outflowing gas flows directly and/or after deflection at the angled region 32 of the gas generator support 3 through the opening 31 in the gas generator support 3 into the upper region 12 of the airbag 1. Thereupon, this region 12 is inflated, wherein the covering cap 4 tears open in a manner known per se, so that the airbag 1 can exit from the airbag module.

Since the lower region 13 of the airbag 3 encloses the gas generator 2, this inflation process of the airbag 1 leads to the fact that the airbag 1, namely its airbag portion 14 enclosing the gas generator 2, pulls the gas generator 2 onto the gas generator support 3. The gas generator 2 thus is pressed against the gas generator support 3.

This leads to two effects. On the one hand, the gas generator 2 is secured on the generator support 3, so that it can be refrained from connecting the gas generator 2 and the generator support 3 with each other via screw connections. Rather, it is sufficient to fix the gas generator at the generator support via the above-mentioned clamping connections such that the generator support is secured against being detached from the generator support 3 during transport or during operation of a motor vehicle.

On the other hand, when filling the airbag 1 with gas, the airbag 1 is automatically sealed in the region of the gas generator opening 11 by the gas generator 2 pressing against the generator support 3. Thus, the airbag portion 15 which is located between the gas generator 2 and the gas generator support 3 is clamped between the same in a gas-tight manner. The opening 11 in the airbag 1 hence is sealed in the region facing the generator support 3, so that gas entering the airbag cannot flow off through the gas generator opening 11, or only to a reduced extent. In addition, a sealing effect also is achieved in the region of the gas generator opening 11, which faces away from the generator support 3. Thus, the airbag portion 14 adjoining this region of the gas generator opening 11 is pressed against the gas generator 2, so that even in this region no or only so little gas can emerge from the opening 11.

Figure 4:
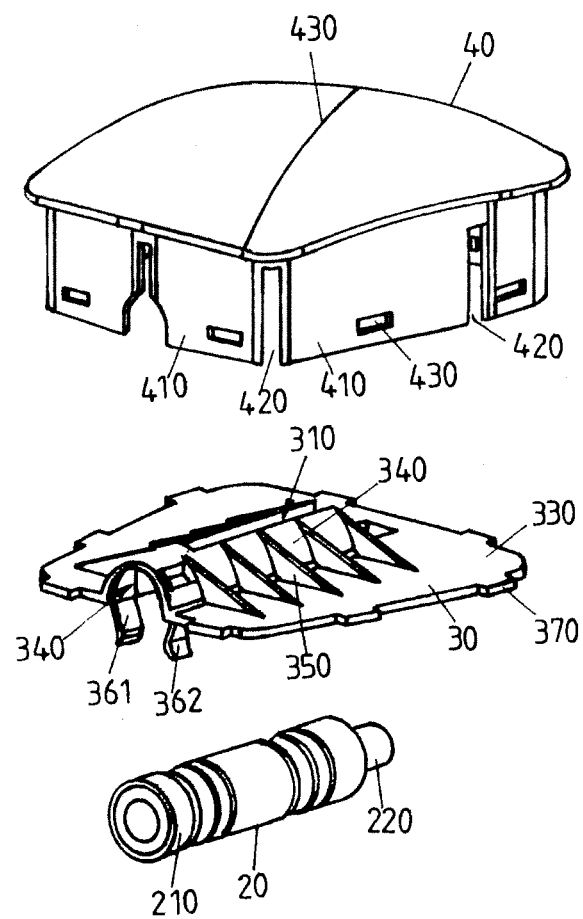
FIG. 4 shows an exemplary embodiment of an airbag module with a gas generator, a gas generator support and a covering cap, wherein the airbag is not represented.

FIG. 4 shows an exemplary embodiment of an airbag module which is formed corresponding to the design shown in principle in FIGS. 1 to 3. The airbag itself is not shown in the representation of FIG. 4 for better clarity.

The airbag module comprises a tubular gas generator 20, a gas generator support 30 and a covering cap 40. The gas generator 20 has a first end 210 and a second end 220 with gas outflow openings (not shown). The generator support 30 consists of a base plate 330 in which a substantially cylindrical receiving region 340 is formed for accommodating the gas generator 20. On the bottom side of the base plate 330 two clamping arms 361, 362 are provided, by means of which the gas generator 20 can be locked into place at the generator support 30. The receiving region 340 is structurally reinforced by reinforcing struts 350.

Figure 5:
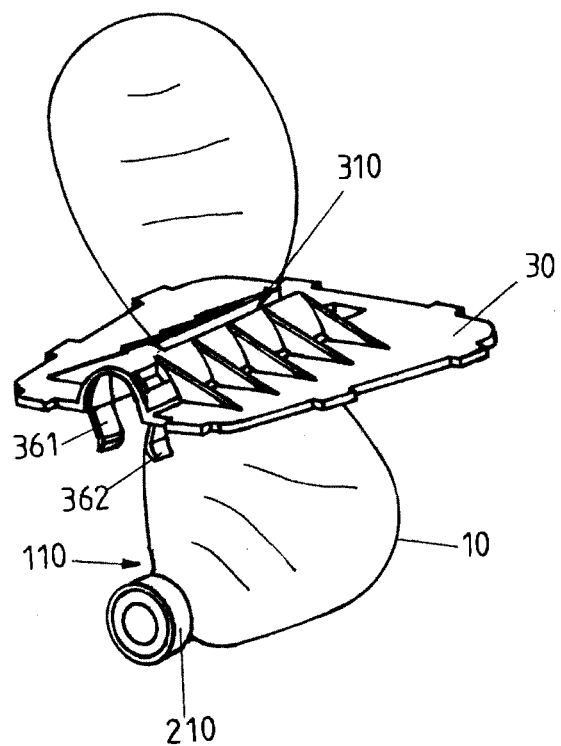
FIG. 5 schematically shows the gas generator and the gas generator support of FIG. 4 together with an airbag into which the gas generator is introduced and which partly is guided through an opening of the gas generator support.

On the upper side of the base plate 330 the receiving region 340 forms a longitudinal slot 310 in the generator support 30, through which corresponding to FIG. 2 the airbag is pulled during assembly, cf. also the following explanations concerning FIG. 5. The generator support 30 furthermore includes protrusions 370 which serve the fixation of the covering cap 40.

The covering cap 40 includes a plurality of side walls 410 which are separated by gaps 420, so that the side walls 410 each are flexible. The side walls 410 include recesses 430 which correspond with the protrusions 370 of the generator support 30 and provide for a latching connection between the covering cap 40 and the generator support 30. The covering cap 40 furthermore has a tear line 430.

FIG. 5 schematically shows the assembly of the airbag not shown in FIG. 4. Before and after introducing the gas generator 20 into a gas generator opening 110 of the airbag 10, the airbag 10 is pulled through the gap 310 of the generator support. Corresponding to FIG. 2, this is done until the gas generator 20 is pulled onto the generator support 30 and locked into place at the same via the clamping arms 361, 362. The gas generator 20 is disposed inside the airbag 10. The region of the airbag pulled through the slot 310 is folded to an airbag package and the arrangement is closed by means of the covering cap 40.

Figure 6:
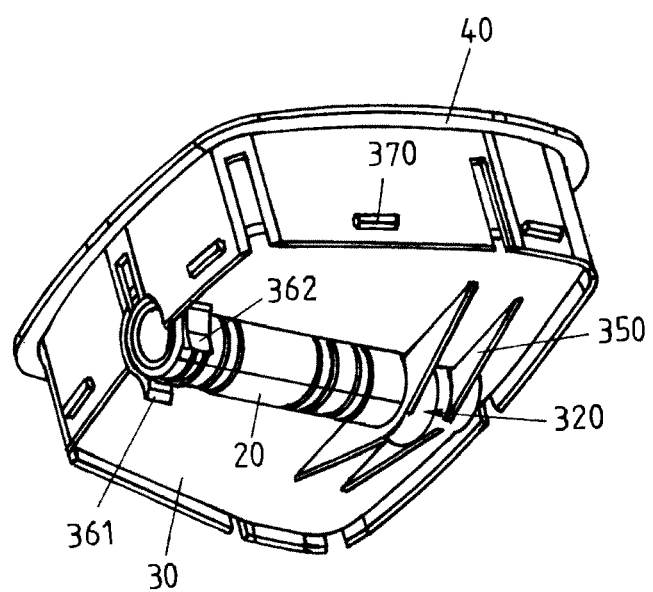
FIG. 6 shows the assembled airbag module of FIG. 4, wherein the airbag again is not represented.

FIG. 6 shows the completely assembled airbag module, again without the airbag, so as to be able to better represent the arrangement of the gas generator 20 at the generator support 30. The gas generator 20 is clamped to the bottom side of the generator support 30 by means of the clamping arms 361, 362. The gas outlet region of the gas generator 20 is arranged in a region 320 of the generator support 30 which additionally supports the one end 220 of the gas generator 20 and moreover directs gas emerging from the gas generator 20 in direction of the upper side of the generator support 30. This receiving region 320 likewise is structurally reinforced by reinforcing struts 350.

The covering cap 40 is latched with the generator support 30 via the latching connections 370, 430, wherein the generator support 30 and the covering cap 40 form the housing of the airbag module. The airbag for the most part is disposed in a folded condition between the generator support 30 and the covering cap 40. At least one fabric layer of the airbag, however, extends through the opening 310 of the generator support 30 and around the gas generator 20, so that in case of activation the airbag pulls the gas generator 20 onto the gas generator support 30.

The invention is not limited in its design to the exemplary embodiments described above, which should merely be understood by way of example. For example, the gas generator, the generator support and the airbag can have a shape other than described. It should also be noted that the covering cap 4, 40 shown in FIGS. 3, 4 and 6 is merely optional. The airbag can also be protected against adjoining components for example by a flexible envelope or an airbag fold.

The priority application, German Patent Application Number 10 2009 018 168.7 filed on Apr. 20, 2009 is incorporation by referenced herein.

The invention claimed is:

1. An airbag module for a vehicle occupant restraint system, comprising:
   an airbag which includes a gas generator opening for introducing a gas generator into the airbag,
   a gas generator introduced into the gas generator opening and at least partly arranged in the airbag, which in case of activation blows gas into the airbag, and
   a gas generator support on which the gas generator is fixed,
   wherein the gas generator is arranged with respect to the gas generator support such that in case of activation the airbag pulls the gas generator onto the gas generator support,
   wherein the gas generator support has an opening through which the non-inflated airbag is pulled, such that a first region of the airbag, which does not surround the gas generator, is located on the one side of the opening and a second region of the airbag, which surrounds the gas generator, is located on the other side of the opening, and the opening is dimensioned such that the gas generator cannot be pulled through the opening;
   wherein the gas generator is a tubular gas generator that has a dimension along its longitudinal axis that is larger than a dimension of the gas generator in the radial direction;
   wherein the gas generator support is configured for fixing the airbag module to a vehicle structure different from the gas generator and the airbag;
   wherein the airbag and the gas generator opening are formed and arranged such that in case of activation the gas generator opening is closed in a gas-tight manner by the gas generator pressing against the gas generator support.

2. The airbag module according to claim 1, wherein the opening is formed as slot.

3. The airbag module according to claim 1, wherein the first region of the airbag, which does not surround the gas generator, is folded to an airbag package.

4. The airbag module according to claim 1, wherein the gas generator is locked into place on the gas generator support.

5. The airbag module according to claim 4, wherein the gas generator support has a first side and a second side, the first region of the airbag, which does not surround the gas generator, is arranged on the first side of the gas generator support and the gas generator is locked into place on the gas generator support on its second side.

6. The airbag module according to claim 1, wherein the tubular gas generator is locked into place on the gas generator support by means of latching arms which at least partly surround the tubular gas generator on its circumference.

7. The airbag module according to claim 1, wherein the airbag module furthermore includes a cover which surrounds the folded airbag, wherein the cover is latchable with the gas generator support.

8. The airbag module according to claim 1, wherein a portion of the airbag adjoining the gas generator opening at least partly extends between the gas generator and the gas generator support, so that in case of activation, when the gas generator presses against the gas generator support, this portion is clamped between the gas generator and the gas generator support in a gas-tight manner.

9. An airbag module according to claim 1,
   wherein the gas generator support has a first side and a second side, the first region of the airbag, which does not surround the gas generator, is arranged on the first side of the gas generator support and the gas generator is arranged completely on the second side of the gas generator support.

10. A method for producing an airbag module of a vehicle occupant restraint system with the following steps:
    providing an airbag, which includes a gas generator opening for introducing a gas generator into the airbag, a gas generator and a gas generator support,
    introducing the gas generator into the gas generator opening, and
    arranging the gas generator with respect to the gas generator support, such that in case of activation the airbag pulls the gas generator onto the gas generator support, wherein
    the non-inflated airbag is pulled through an opening of the gas generator support such that a first region of the airbag, which does not surround the gas generator, is located on the one side of the opening and a second region of the airbag, which surrounds the gas generator, is located on the other side of the opening;
    wherein the gas generator is a tubular gas generator that has a dimension along its longitudinal axis that is larger than a dimension of the gas generator in the radial direction;
    wherein the gas generator support is configured for fixing the airbag module to a vehicle structure different from the gas generator and the airbag;
    wherein the airbag is arranged with respect to the gas generator and the gas generator support such that in case of activation the gas generator opening is closed in a gas-tight manner by the gas generator pulling onto the gas generator support.

11. The method according to claim 10, wherein the gas generator is formed and arranged such that gas emerging from the gas generator at least chiefly fills the first region of the airbag.

* * * * *

UNITED STATES PATENT AND TRADEMARK OFFICE
CERTIFICATE OF CORRECTION

| | | |
|---|---|---|
| PATENT NO. | : 8,454,051 B2 | Page 1 of 1 |
| APPLICATION NO. | : 13/274121 | |
| DATED | : June 4, 2013 | |
| INVENTOR(S) | : Steffen Weigand | |

It is certified that error appears in the above-identified patent and that said Letters Patent is hereby corrected as shown below:

On the Title Page, Item (63) should read

(63) Related to U.S. Application Data

Continuation of application No. PCT/EP2010/055101, filed on April 19, 2010.

Signed and Sealed this

Seventeenth Day of June, 2014

Michelle K. Lee
*Deputy Director of the United States Patent and Trademark Office*